(12) United States Patent
Mellier et al.

(10) Patent No.: US 9,284,700 B2
(45) Date of Patent: Mar. 15, 2016

(54) SEAL FOR CABLE ANCHOR DEVICE OF A CABLE CONSTRUCTION

(75) Inventors: Erik Mellier, Viroflay (FR); Ivica Zivanovic, Arnouville les Gonesse (FR)

(73) Assignee: SOLETANCHE FREYSSINET, Rueil Malmaison (FR)

(*) Notice: Subject to any disclaimer, the term of this patent is extended or adjusted under 35 U.S.C. 154(b) by 0 days.

(21) Appl. No.: 14/395,935

(22) PCT Filed: Apr. 5, 2012

(86) PCT No.: PCT/IB2012/000940
§ 371 (c)(1),
(2), (4) Date: Oct. 21, 2014

(87) PCT Pub. No.: WO2013/150329
PCT Pub. Date: Oct. 10, 2013

(65) Prior Publication Data
US 2015/0137462 A1  May 21, 2015

(51) Int. Cl.
*F16J 15/02* (2006.01)
*E01D 19/14* (2006.01)
*E04C 5/12* (2006.01)
*E01D 21/00* (2006.01)

(52) U.S. Cl.
CPC ............... *E01D 19/14* (2013.01); *E01D 21/00* (2013.01); *E04C 5/12* (2013.01); *F16J 15/021* (2013.01); *Y10T 29/49826* (2015.01)

(58) Field of Classification Search
CPC ........... F16J 15/00; F16J 15/02; F16J 15/021; F16J 15/025
See application file for complete search history.

(56) References Cited

U.S. PATENT DOCUMENTS 4,758,003 A * 7/1988 Goldstein et al. ............. 277/314
4,837,885 A   6/1989 Yang

FOREIGN PATENT DOCUMENTS

| DE | 3410448 A1 | 9/1985 |
| EP | 0128098 A2 | 12/1984 |
| WO | 2004094730 A1 | 11/2004 |

* cited by examiner

*Primary Examiner* — Gilbert Lee
(74) *Attorney, Agent, or Firm* — Dentons US LLP

(57) ABSTRACT

A seal for sealing a cable anchor device (4) to a structural element (1, 3), the cable anchor device (4) being arranged to anchor at least one cable (2) to the structural element (1,3) and having a front surface (15) facing an opening (6) of the structural element, through which front surface the at least one cable (2) extends towards the exterior of the structural element, characterized in that the seal comprises a sleeve (12) which extends from a perimeter of a surface of the structural element including the opening (6) of the structural element to a perimeter of a hermetic portion of the anchored cable (2) comprising at least the front surface (15) of the anchor device (4).

15 Claims, 3 Drawing Sheets

SEAL FOR CABLE ANCHOR DEVICE OF A CABLE CONSTRUCTION

This application is a 35 U.S.C. §371 National Stage entry of International Application No. PCT/IB2012/000940, filed on Apr. 5, 2012, which is hereby incorporated by reference in its entirety.

BACKGROUND OF THE INVENTION

The present invention relates generally to a seal used for a structural cable, and more particularly, to a seal used for sealing an anchor device of a cable to a structural element of a construction work.

In such construction work, for example, cable-stayed bridges, suspension bridges or the like, a structural cable, subjected to tension loadings, connects a top portion of the towers of these bridges to their decks via their anchor devices.

The anchor devices of the structural cable, situated on the top portions of the towers and/or at the level of the decks, serve to transmit tensile loads from the cable to the structure of the construction work. The portions of the towers and deck to which the anchor devices are connected have in many case a hollow structure, the volume inside of such hollow structure is normally hermetic in order to protect the inside volume from external environmental conditions, especially from humidity in order to prevent corrosion of metal structures and/or equipment, such as the anchor devices of the structural cable, inside the hollow structure of the decks and/or the towers of the bridge.

The corrosion protection of the volume inside of the hollow structure is commonly performed by dehumidification of the air contained inside in a way known in the art, for example by maintaining a humidity of air less than 40% to prevent effectively the corrosion of metal. Furthermore, to better limit the corrosion over a long period, the hollow structures should be as hermetic as possible in order to prevent the penetration of moisture from the outside of the hollow structures.

In the case of a stayed-cable bridge as shown in FIG. 1, each stayed cable 2 for supporting a bridge deck 1 is anchored respectively by an anchor device 4 to the deck at point D and to the top portion of the tower 3 at point T, with the details of the anchor device as shown in FIG. 2. The anchor region of the deck and/or of the tower has a hollow structure and a wall 5 of the hollow structure is traversed at many places by the stayed cables which are all singular points needed to be sealed. Because the cables are movable at the level of an opening 6 of the wall 5, variations of loads, movements of the structure and vibrations of the cable will complicate sealing problem, especially in the case where the stayed cable has a plurality of parallel strands 7 sheathed or not, as shown in FIG. 2.

To prevent the penetration of moisture inside the hollow structure, an intuitive solution is to extend continually the natural boundary that is the wall 5 of the hollow structure around the stayed cable, to the centre of the opening through which passes the stayed cable, even between the strands 7 of the stayed cable. For example, the space between the parallel strands 7 can be filled with a soft and sticky product, such as a type of silicone seal.

The realization of this boundary is difficult, as one must remove the strands under tension to inject silicone into the interstices, and it is very difficult to be sure that all voids between the strands are effectively filled. Furthermore, the maintenance of the cable structure having such a sealing system is very difficult. When replacing a strand, for example, the sealing system is typically damaged, because sealing product is torn during intervention on the strand.

Another solution is to place the entire anchor device and thus all of the stayed cable outside the dehumidified zone but inside of the hollow structure. This solution has the disadvantage that the anchor device and the supporting structure of the anchor device, typically formed of metal, cannot benefit from the highly effective corrosion protection of dehumidification inside of the hollow structure.

It is an object of the present invention to solve the above-described problems and to provide an improved sealing system and method for the anchor device of a structural cable in a construction work.

SUMMARY OF THE INVENTION

In accordance with the present invention, the seal for sealing a cable anchor device to a structural element of a construction is essentially characterized in that a sleeve extends from a perimeter of a surface of the structural element including an opening of the structural element to a perimeter of a hermetic portion of the anchored cable.

Thus, the invention comprises realigning the intuitive boundary to an already exiting hermetic portion of the anchored cable. If the cable connected to the anchor is not equipped with a common protective sheath, such hermetic portion includes a front surface of the anchor device. If the cable connected to the anchor is equipped with the common protective sheath, such hermetic portion includes also a part of the common protective sheath of the anchored cable. The common protective sheath is normally fixed to the anchor device in a hermetical manner, for example connected to the front surface of the anchor device. Such arrangements avoid extension of seal material following the wall of the hollow structure and directly crossing the strands of structure cable in the prior art. The front surface corresponds to an airtight panel or block inside of the anchor device of the structural cable and facing the opening of the hollow structure through which the at least one structural cable passing to the exterior of the construction. Such solution avoids effectively crossing directly the bundle of strands by injecting sealing product between the strands, while leaving the support structure of the anchor device inside the hollow structure.

Thus, by virtue of such an arrangement, the anchor device and its supporting structure are protected against corrosion by benefiting the highly effective corrosion protection of dehumidification inside of the hollow structure of the construction. The seal extending to a perimeter of the front surface of the anchor device or of the common protective sheath, assuring a high hermetic capacity even in case of movements of the cable. Since the sealing sleeve is not in direct contact with the strands, the maintenance of the cable (replacing a strand, for example), becomes easier without damage of the sealing arrangement of the anchor device.

In some preferred embodiments of the seal for sealing a cable anchor device to a structural element of a construction according to the present invention, recourse is further had to one and/or other of the following arrangements which can be considered solely or in combination.

The sleeve comprises at least a flexible membrane encircling the structural cable, or if the structural cable is wrapped in a common protective sheath, the flexible membrane encircles therefore the common protective sheath of the structural cable. Such common protective sheath can be fixed to the anchor device. The protective sheath and the front surface of the anchor device are constituted by a non-corrosive material; the common protective sheath can come directly into contact with the front surface of the anchor device both of which are made of non-corrosive material.

A sealing method for sealing a cable anchor device to a structural element of a construction is also provided to implement the seal according to present invention. A cable construction work having at least a seal realised according to the aforesaid features is also provided by the present invention.

BRIEF DESCRIPTION OF THE DRAWINGS

Further features and advantages of the invention will become apparent in the course of the following detailed description of the embodiments which are given by way of non limiting examples with reference to the appended drawings, in which.

DESCRIPTION OF PREFERRED EMBODIMENTS

The invention is described herein below in its application to stayed cable bridges, without this implying any limitation to other types of cable construction.

Figure 1:
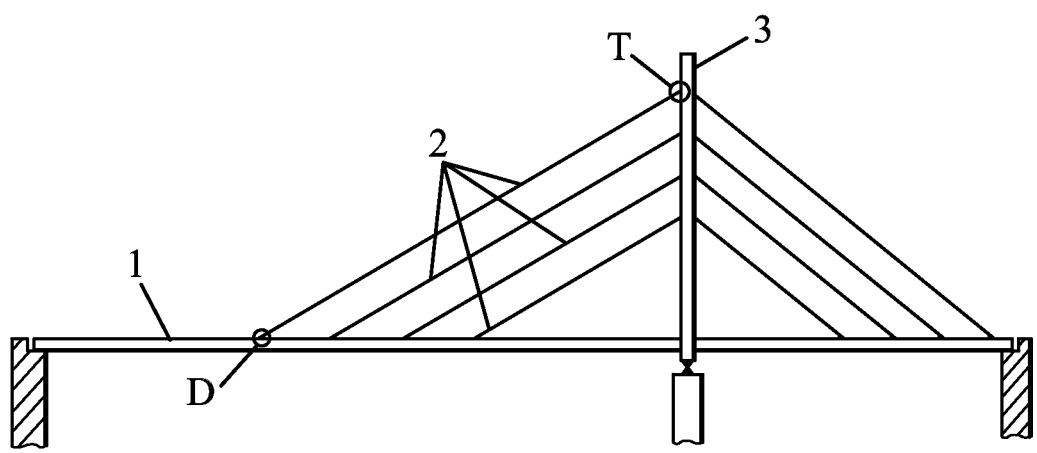
FIG. 1 is a view showing an example of a cable stayed bridge, as already presented in the above paragraphs.

The construction work depicted in FIG. 1 is, for example, a stayed cable bridge. This bridge conventionally has a deck 1, at least one tower 3 and one or more pluralities of stayed cables 2. The stayed cables 2 are stretched between two anchor devices against two structural elements, meaning the tower at points T and the deck at points D. In the example considered here, one stayed cable 2 consists of a bundle of parallel strands 7. These strands can be individually protected by coating of a product that affords protection against corrosion (grease for example) and contained in an individual protective sheath made of plastic, for example a high density polyethylene (HDPE).

Figure 2:
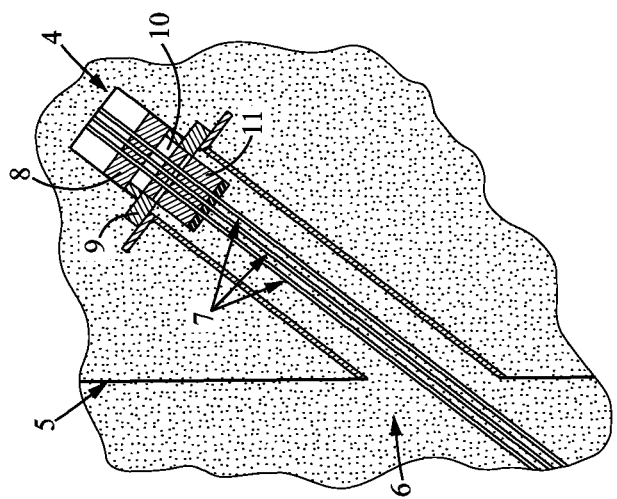
FIG. 2 is an enlarged sectional view at points T or D of FIG. 1 of an anchor device before sealing according to present invention.

As shown more particularly in FIG. 2, the anchor device 4 comprises an anchor block 8 applied against a bearing piece 9 along a bearing surface (not shown) substantially perpendicular to the overall direction of the stayed cable 7. The bearing piece 9 is pressed, at the opposite end to the anchor block, against the structural element, i.e. the tower or the deck, to which the stayed cable is connected.

To reliably anchor the individually protected strands, the individual protection of each strand 7 has a bared end portion in a chamber 10 lying behind the anchor block 8. To prevent corrosion, a filler product can be injected into the chamber 10 and into the gaps left free between the strands and the block 8. To prevent spreading of the filler product, the opposite end of the chamber 10 to the anchor block 8 is closed by a sealing device 11 which seals each individually sheathed strand 7. The sealing device 11 may in particular be of the stuffing box type, as described in application EP 0323285 A, or be of the packing box type consisting of perforated plates made of rigid plastic material, as described in application WO 01/10098.

Whichever type is used, the sealing device 11 effectively constitutes a front surface of the anchor device 4, which front surface of the anchor device is, by its very nature, sealed so as not to allow moisture to get inside the anchor device 4.

The tower 3 and/or the deck 1 have a hollow structure which is normally hermetic, inside of which the anchor devices 4 are housed. The anchored stayed cable 2 passes through a wall 5 of the hollow structure forming an opening 6 of the hollow structure on the tower 3 or on the deck 1, which should be sealed in order to ensure the hermeticity of the hollow structure of the tower and/or the deck. If the individually protected strands of the stayed cable 2 are not wrapped in a common protective sheath, the seal of the hollow structure at the level of the opening is completed once the junction between a perimeter of a surface of the hollow structure including the opening 6 and a perimeter of the front surface of the anchor device is made.

Figure 3:
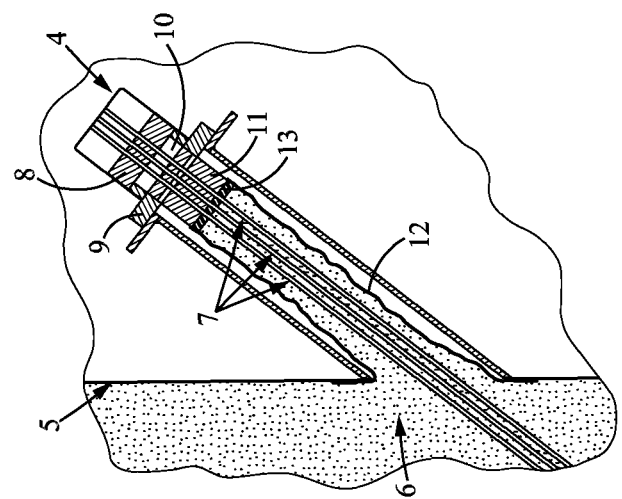
FIG. 3 is an enlarged sectional view at points T or D of FIG. 1 of an anchor device after sealing according to a first embodiment of present invention.

Such seal can be obtained in the example of FIG. 3, by providing and hermetically attaching a non-structural sleeve having two sides between the perimeter of a surface of the hollow structure including the opening of the hollow structure and the perimeter of the front surface of the anchor block 8, for example, the perimeter of the sealing device 11. The non-structural sleeve can be firstly fixed on one side to the perimeter of a surface of the hollow structure including the opening 6 of the hollow structure or firstly to the perimeter of the front surface of the anchor device 4, and secondly be extended by another side to the perimeter of the front surface of the anchor device 4, or to the perimeter of a surface of the hollow structure including the opening 6 of the hollow structure accordingly.

The geometry and material of the sleeve may vary according to that of each opening to be sealed, for example a flexible membrane, such as rubber or rubber membrane, coated fabric, etc., can be advantageous.

In the embodiment of FIG. 3, the cable 2 constituted by the individually protected strands 7 is not equipped with an external common protective sheath. The non-structural sleeve 12, for example, a flexible membrane can be placed firstly on a surface of the hollow structure around or of the opening 6 for the anchor device on the hollow structure, and can secondly extend directly toward the frond surface of the anchor device 4, preferentially to the level of a front panel 13 of the sealing, device 11 behind the anchor block 4 as shown in FIG. 3. Finally, on the first side, an inner periphery of the sleeve is hermetically attached around the front surface of the anchor device 4, and on the second side, an outer periphery of the sleeve is also hermetically attached to a surface of the hollow structure around or of the opening 6 on the wall of the ho Row structure.

If the bearing surface of the anchor device 4 is arranged on a concrete type hollow structure, the attachment of the sleeve to a surface of the hollow structure including the opening is preferably realised on an exterior surface of the wall around the opening as illustrated in FIGS. 2-3, or on a surface of the opening inside the wall of the concrete type hollow structure (not shown). If the bearing surface of the anchor device 4 is arranged on a fixed steel type hollow structure, the attachment of the sleeve to a surface of the hollow structure including the opening is preferably realised on an interior surface of the wall of the fixed steel type hollow structure (see FIG. 4).

As already cited above, the flexible membrane can also be placed firstly on the front surface of the anchor device 4 and then extend directly toward a surface around or of the opening 6 for the anchor device on the hollow structure. The attachment of the sleeve may be in a way known in the art, such as an adhesive or chemical bonding or mechanically screwing, clipping with a collar, etc.

Figure 4:
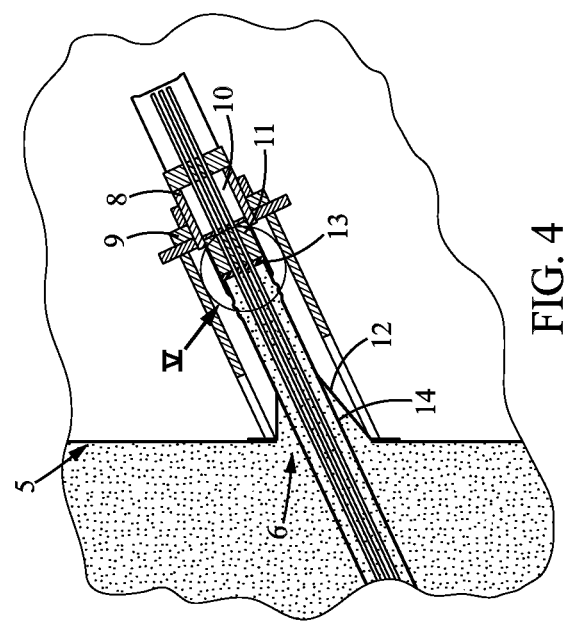
FIG. 4 is an enlarged sectional view at points T or D of FIG. 1 of an anchor device after sealing according to a second embodiment of present invention.

In many cases, the individually protected strands are also enclosed in a co-extruded high density polyethylene (HDPE) stayed common protective sheath, for protecting against ultra-violet (UV) light while ensuring an aesthetic and an aerodynamic effect for the cable construction. The seal depicted in FIG. 4 is configured to adapt the strands enveloped by a common protective sheath 14 in the form of a tube connected to the anchor block 8. The sleeve 12, for example a flexible membrane, is placed between the hollow structure and the common protective sheath which can achieve the same objective as the first embodiment. The advantage of this embodiment is that the sleeve is small in size, because it tightly and directly connects to the external surface of the common sheath without looking for the front surface of the anchor device, as shown in FIG. 4.

Figure 5:
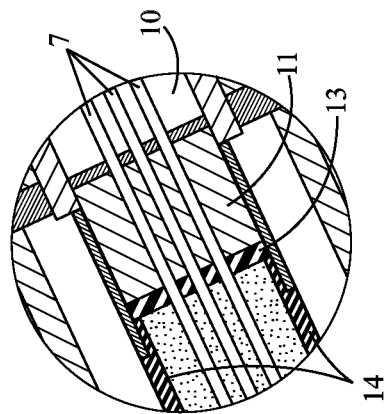
FIG. 5 is an enlarged sectional view at point F of FIG. 4 according to a second embodiment of present invention.

In the sealing arrangement according to present invention, the front surface of the anchor device 4 is exposed to the exterior of the hollow structure, which is normally not dehumidified. This part of the anchor device will therefore be advantageously made of non-corrosive and airtight materials, for example the corrosion-resistant front panel 13 as shown in FIG. 5. The interior of the protective sheath 14 can also be dehumidified, the seal according to the present application applies also to such arrangement.

In embodiments where the common protective sheath 14 envelops the strands 7, the upper border of the common protective sheath 14 will be advantageously in contact with the corrosion-resistant front panel 13, as shown in FIG. 5, to protect the anchor device from humidity, while ensuring that no corrodible part of the anchor device is exposed to the external environment.

The non-structural sleeve 12 according to present invention may be made of any suitably flexible and airtight materials, which do not contribute to form a part of the structural element of the construction, but only serve as a seal for the cable anchor device of the construction at the level of an opening of the structural element. The present invention provides a sleeve which can be used with an anchorage system of various shapes and sizes, instead of having customized parts in accordance with the art.

Also because of the flexibility of the sleeve, the normal movements of the cable do not have any negative effect on the sealing function of the sleeve. The front surface of the anchor device participates effectively in the sealing function by its hermetic nature. The sealing interfaces are thus constituted, in the centre of the opening of the structural element, by the front surface of the anchor device, in particular by the sealing device for example, and along the cable until or beyond the periphery of the opening, by the sleeve flowing the external wall of the cable and the surface of the hollow structure. Such configuration makes the maintenance of the seal simplified when compared with that of the art, since the seal is thus obtained without any intervention inside of the cable between the strands. The anchor block is always housed in the hollow and hermetic structure of the construction, to benefit the highly effective corrosion protection of dehumidification inside of the hollow structure. Even in cases where maintenance is performed on the strands, the seal of the present invention is advantageous since the sleeve is not in direct contact with the strands and the front surface of the anchor device is also configured to be compatible with such an operation (for example, the replacement of strands).

Many modifications and variations of the present invention are made possible in light of the above teachings. For example, the seal for a cable anchor device of a structural element according to the present invention may be utilized in any structural cable of a construction work on which an opening is provided for passing the structural cable, or any slightly movable element. It is therefore to be understood that within the scope of the appended claims, the invention may be practised otherwise than as specifically described.

What is claimed is:

1. An apparatus, comprising:
   a seal for sealing a cable anchor device to a structural element, the cable anchor device being arranged to anchor at least one cable to the structural element and having a front surface facing an opening of the structural element, through which the front surface of the at least one cable extends towards the exterior of the structural element,
   wherein the seal comprises a sleeve which extends from a perimeter of a surface of the structural element including the opening of the structural element to a perimeter of a hermetic portion of the anchored cable comprising at least the front surface of the anchor device.

2. The apparatus of claim 1, wherein the sleeve comprises at least a flexible membrane encircling the structural cable.

3. The apparatus of claim 2, wherein the cable is wrapped in a protective sheath and the flexible membrane encircles the protective sheath.

4. The apparatus of claim 3, wherein the protective sheath is fixed to the anchor device.

5. The apparatus of claim 3, wherein the protective sheath is fixed to the front surface of the anchor device.

6. The apparatus of claim 5, wherein the sleeve extends from the perimeter of a surface of the structural element including the opening of the structural element to the protective sheath.

7. The apparatus of claim 1, wherein the front surface of the anchor device is made of a non-corrosive material.

8. A cable construction work having at least an anchor device for anchoring the cable to the construction, wherein the anchor device includes a seal according to claim 1.

9. A sealing method for sealing a cable anchor device to a structural element, the cable anchor device being arranged to anchor at least one cable to the structural element and having a front surface facing an opening of the structural element, the method comprising:
   providing a sleeve having two sides which extend to a perimeter of a surface of the structural element including the opening of the structural element on a first side of the sleeve, and to a perimeter of a hermetic portion of the anchored cable comprising at least the front surface of the anchor device on a second side of the sleeve;
   attaching the first side of the sleeve on the perimeter of a surface of the structural element including the opening of the structural element and the second side of the sleeve perimeter of the front surface of the anchor device.

10. The sealing method of claim 9, wherein the sleeve comprises at least a flexible membrane encircling the cable.

11. The sealing method of claim 10, wherein the protective sheath is fixed to the anchor device.

12. The sealing method of claim 9, wherein the cable is wrapped in a protective sheath and the membrane encircles the protective sheath.

13. The sealing method of claim 12, wherein the protective sheath is fixed to the front surface of the anchor device.

14. The sealing method of claim 13, characterized in that the sleeve extends from a perimeter including the opening of the structural element to the protective sheath.

15. The sealing method of claim 9, wherein the front surface of the anchor device is made of a non-corrosive material.

* * * * *